(12) United States Patent
Sasaki et al.

(10) Patent No.: US 7,376,316 B2
(45) Date of Patent: May 20, 2008

(54) MANUFACTURING METHOD OF OPTICAL FIBER PREFORM, MANUFACTURING METHOD OF OPTICAL FIBER, AND OPTICAL FIBER

(75) Inventors: Takashi Sasaki, Yokohama (JP); Masaaki Hirano, Yokohama (JP); Tomoyuki Yokokawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 134 days.

(21) Appl. No.: 10/567,912

(22) PCT Filed: Aug. 3, 2004

(86) PCT No.: PCT/JP2004/011431

§ 371 (c)(1),
(2), (4) Date: Feb. 10, 2006

(87) PCT Pub. No.: WO2005/014498

PCT Pub. Date: Feb. 17, 2005

(65) Prior Publication Data

US 2006/0204189 A1   Sep. 14, 2006

(30) Foreign Application Priority Data

Aug. 11, 2003  (JP) .............................. 2003-291344

(51) Int. Cl.
*G02B 6/00* (2006.01)
(52) U.S. Cl. ....................................... 385/123; 385/127
(58) Field of Classification Search ................... None See application file for complete search history.

(56) References Cited

U.S. PATENT DOCUMENTS 4,820,322 A   4/1989   Baumgart et al.

(Continued)

FOREIGN PATENT DOCUMENTS

JP    62-132740    6/1987

(Continued)

OTHER PUBLICATIONS

"Optical Fiber Communications" International Edition 1991. McGraw-Hill, Inc. pp. 66-67.

(Continued)

*Primary Examiner*—Sung H Pak
(74) *Attorney, Agent, or Firm*—McDermott Will & Emery LLP

(57) ABSTRACT

Methods of manufacturing an optical fiber preform and an optical fiber, and an optical fiber formed by this method of manufacturing an optical fiber are provided, the optical fiber preform having a desired refractive index profile and being capable of suppressing an increase in loss due to the absorption by OH groups. A pipe is formed by an inside vapor phase deposition method such that glass layer to be formed into a core and a glass layer to be formed into a part of a cladding pipe are deposited in a starting pipe, the glass layers each containing at least one of fluorine, germanium, phosphorous, and chlorine, the starting pipe being made of a silica glass having an outside diameter in the range of 20 to 150 mm and a wall thickness in the range of 2 to 8 mm. The pipe thus formed is collapsed to form a glass rod in which the concentration of hydroxyl groups is 10 weight ppm or less in a region from the surface of the glass rod to a depth of 1 mm therefrom.

20 Claims, 13 Drawing Sheets

U.S. PATENT DOCUMENTS

2005/0201699 A1* 9/2005 Ball et al. .................. 385/123
2006/0191294 A1* 8/2006 Ganz et al. .................. 65/404

FOREIGN PATENT DOCUMENTS

| JP | 2002-154839 | 5/2002 |
| JP | 2003-192372 | 7/2003 |
| JP | 2003-221251 | 8/2003 |
| WO | WO 01/05721 | 1/2001 |

OTHER PUBLICATIONS

International Preliminary Examination Report issued in corresponding International Application No. PCT/JP2004/011431, dated May 8, 2006.

* cited by examiner

Flow rate of mixed gas of SF₆ and CL₂

MANUFACTURING METHOD OF OPTICAL FIBER PREFORM, MANUFACTURING METHOD OF OPTICAL FIBER, AND OPTICAL FIBER

RELATED APPLICATION

This application is a national phase of PCT/JP2004/011431 filed on Aug. 3, 2004, which claims priority from Japanese Application No. JP 2003-291344 filed on Aug. 11, 2003, the disclosures of which Applications are incorporated by reference herein. The benefit of the filing and priority dates of the International and Japanese Applications is respectfully requested.

TECHNICAL FIELD

The present invention relates to a method of manufacturing an optical fiber preform having steps of depositing glass layers inside a starting pipe made of silica glass and collapsing the starting pipe, and a method of manufacturing an optical fiber from the preform, and an optical fiber formed by the method.

BACKGROUND ART

In recent optical communication systems, a wavelength division multiplexing (WDM) transmission technique has been increasingly important. In the WDM transmission technique, strict adjustment of the wavelength dependence of dispersion of an optical fiber is strongly desired because it is important to provide uniform transmission properties for each wavelength by decreasing the differences in chromatic dispersion in a wavelength band that is used. Optical fibers in which the wavelength dependence of dispersion is adjusted are, for example, a dispersion shifted optical fiber, a non-zero dispersion shifted optical fiber, a dispersion flattened optical fiber, and a dispersion compensating optical fiber. These optical fibers have a complicated refractive index profile in which a plurality of maximum points and a plurality of minimum points are present.

In order to obtain desired dispersion properties in such an optical fiber as described above, it is important to precisely form the refractive index profile. A method suitable to precisely form the refractive index profile is, for example, an inside vapor phase deposition method such as an MCVD (Modified chemical vapor deposition) method or a PCVD (Plasma-activated chemical vapor deposition) method. As described in "Optical Fiber Communications, International Edition 1991", pp. 66 to 67, published by McGraw-Hill Book Co., the MCVD method has been widely used because an optical fiber preform having high quality can be obtained relatively easily with it.

Also, U.S. Pat. No. 4,820,322 discloses a method of manufacturing an optical fiber, in which method a glass rod formed by collapsing a tube that is provided with glass deposited by an MCVD method is drawn together with an outer portion that is a part of a cladding, while the glass rod and outer portion are being unified together.

Incidentally, in order to obtain a high quality optical fiber, it is important to prevent hydroxyl groups (OH groups) from entering the glass in a manufacturing process. Since an optical fiber in which the wavelength dependence of dispersion is adjusted has a complicated refractive index profile, it is formed by a complicated manufacturing process, and as a result, OH groups are liable to enter the glass. If OH groups are present in a light propagation region of a fiber, light is absorbed by the OH groups, and accordingly the transmission loss increases.

DISCLOSURE OF INVENTION

An object of the present invention is to provide a method of manufacturing an optical fiber preform and an optical fiber with which method a desired refractive index profile can be achieved and an increase in loss due to the absorption by OH groups can be suppressed, and to provide an optical fiber manufactured by the method.

To this end, there is provided a method of manufacturing an optical fiber preform, which method comprises the steps of: subjecting a starting pipe to an inside vapor phase deposition so that a glass layer to be formed into a core and a glass layer to be formed into a part of a cladding are deposited inside the starting pipe, the glass layers each containing at least one of fluorine, germanium, phosphorous, and chlorine, the starting pipe being made of silica glass and having an outside diameter in the range of 20 mm to 150 mm and a wall thickness in the range of 2 mm to 8 mm, and thereby forming a pipe having a glass layer to be formed into a core; and collapsing this pipe so as to form a glass rod in which the concentration of OH groups is 10 weight ppm or less in a region from the surface of the glass rod to a depth of 1 mm therefrom.

The concentration of OH groups is more desirably 1 weight ppm or less.

The starting pipe may be a pipe made of a silica glass containing fluorine. The starting pipe may be formed by depositing fine glass particles, followed by dehydration and consolidation, and the concentration of OH groups present in the starting pipe may be 0.01 weight ppm or less. The unevenness of the wall thickness of the starting pipe may be 0.3% or less along the entire length thereof, and the non-circularity of the inside diameter and that of the outside diameter of the starting pipe may be 1 percent or less.

The inside vapor phase deposition method may be an MCVD method, and the deposition rate of depositing the glass layer may be 0.4 g/min or more. The deposition rate is more desirably 1.0 g/min or more. The total thickness of the glass layer to be formed into a core and the glass layer to be formed into a part of a cladding may be 1 mm or more, and the wall thickness of the pipe having the glass layer to be formed into a core may be 8 mm or less.

The non-circularity of the core of the glass rod may be 0.4% or less, and the number of bubbles present on the central axis of the glass rod may be one or less per 10 mm length. The non-circularity of the glass rod at the part that is deposited by the inside vapor phase deposition method may be 1.5% or less, and the number of bubbles present on the central axis of the glass rod may be one or less per 10 mm length.

The collapsing may include a first heating step in which one end portion of the pipe having the glass layer to be formed into a core is heated and collapsed and a second heating step in which the pipe having the glass layer to be formed into a core is heated and collapsed from the one end portion toward the other end, and a surface heating temperature T1 of the one end portion in the first heating step may be higher than a surface heating temperature T2 of the heated part of the pipe in the second heating step.

A heat source for the MCVD method may be one of an induction furnace, a resistance furnace, and a plasma torch.

In addition, a heat source for the collapsing may be one of an induction furnace, a resistance furnace, and a plasma torch.

In addition, a method of manufacturing an optical fiber is provided which comprises the step of drawing an optical fiber preform manufactured by the method according to the present invention. In the drawing step, the glass rod is inserted into a jacket pipe, and the glass rod and the jacket pipe may be drawn together while they are heated to be unified together. The jacket pipe is formed by depositing fine glass particles, followed by dehydration and consolidation, and the concentration of OH groups present in the jacket pipe may be 0.01 weight ppm or less.

In addition, there is provided an optical fiber manufactured according to a manufacturing method of the present invention. A polarization mode dispersion of the optical fiber may be 0.15 ps/km$^{1/2}$ or less, and the loss due to the absorption by OH groups at a wavelength of 1.38 μm may be 0.2 dB/km or less.

The present invention will be described in detail with reference to figures. The figures are shown for purposes of illustration and are not intended to limit the scope of the present invention.

BEST MODE FOR CARRYING OUT THE INVENTION

Figure 1:
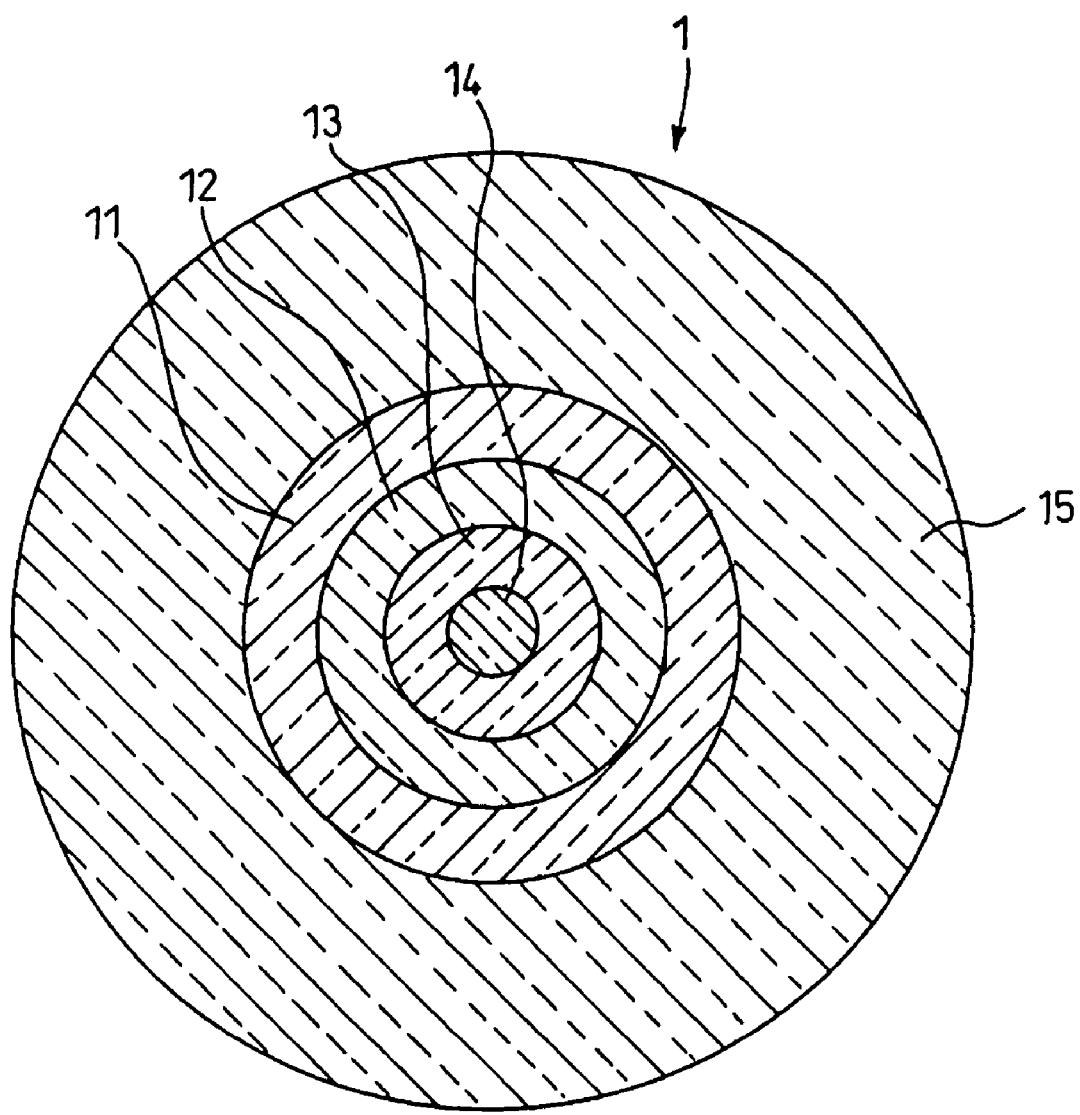
FIG. 1 shows a cross-section of an optical fiber preform manufactured by a method according to the present invention, which cross-section is perpendicular to the central axis of the optical fiber preform.

Hereinafter, embodiments of the present invention will be described with reference to figures. In the figures, in order to avoid duplication of description, the same reference numeral indicates the same portion. The dimensional ratios shown in the figures are not always accurate.

Figure 2:
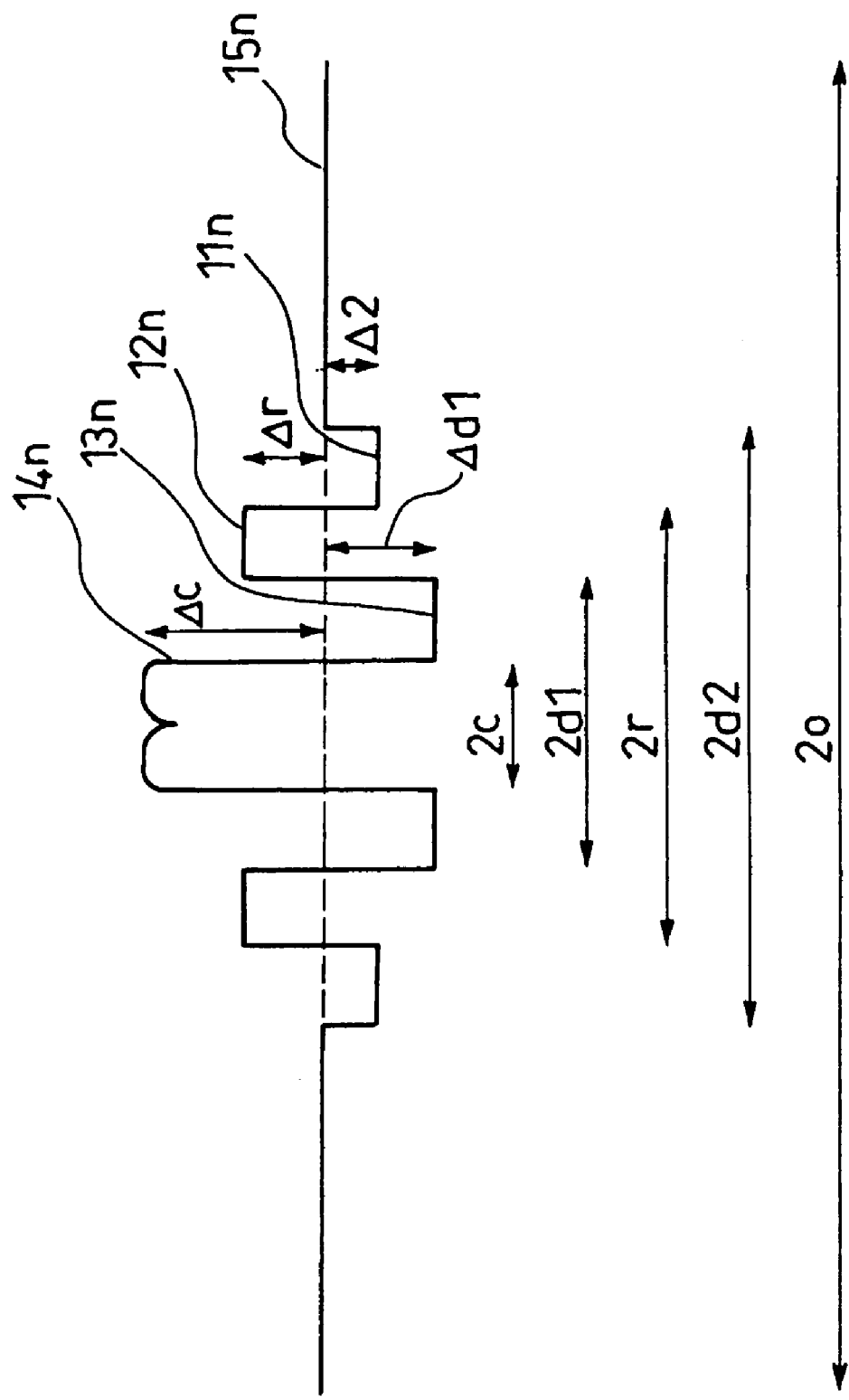
FIG. 2 is a schematic view showing a refractive index profile of the optical fiber preform shown in FIG. 1.

FIG. 1 shows a cross-section of an optical fiber preform manufactured by a method according to the present invention, which cross-section is perpendicular to the central axis of the optical fiber preform. FIG. 2 is a schematic view showing a refractive index profile of the optical fiber preform 1. The optical fiber preform 1 is an optical fiber preform to be formed into an optical fiber having a complicated refractive index profile, such as a dispersion-shifted optical fiber, a dispersion-flattened optical fiber, or a dispersion-compensating optical fiber. The optical fiber preform 1 has a central core 14, a first depressed portion 13, a ring portion 12, a second depressed portion 11, and an outer cladding 15 in that order from the center to the outside. An optical fiber formed from the optical fiber preform 1 has the same cross-sectional structure as that of the optical fiber preform 1.

In FIG. 2, refractive index profiles 14n, 13n, 12n, 11n, and 15n are those of the central core 14, the first depressed portion 13, the ring portion 12, the second depressed portion 11, and the outer cladding 15, respectively. The refractive index profile 14n has a maximum refractive index Nc, the refractive index profile 13n has a minimum refractive index Nd1, the refractive index profile 12n has a maximum refractive index Nr, the refractive index profile 11n has a minimum refractive index Nd2, and the refractive index profile 15n has a maximum refractive index No, in which the individual refractive index satisfies the equation Nc≧Nr>No>Nd2≧Nd1. In addition, relative refractive index differences of the individual refractive index Nc, Nd1, Nr, or Nd2 with respect to the refractive index No of the outer cladding are represented by Δc, Δd1, Δr, or Δd2, respectively.

In addition, in FIG. 2, reference numeral 2c indicates the diameter of the central core 14, reference numeral 2d1 indicates the outside diameter of the first depressed portion 13, reference numeral 2r indicates the outside diameter of the ring portion 12, reference numeral 2d2 indicates the outside diameter of the second depressed portion 11, and reference numeral 2o indicates the outside diameter of the outer cladding 15. In the optical fiber preform 1, although the refractive index profile of the individual region except that of the central core 14 each has a step-like shape, the refractive index profile of the central core 14 has a dip at the center thereof.

Figure 3:
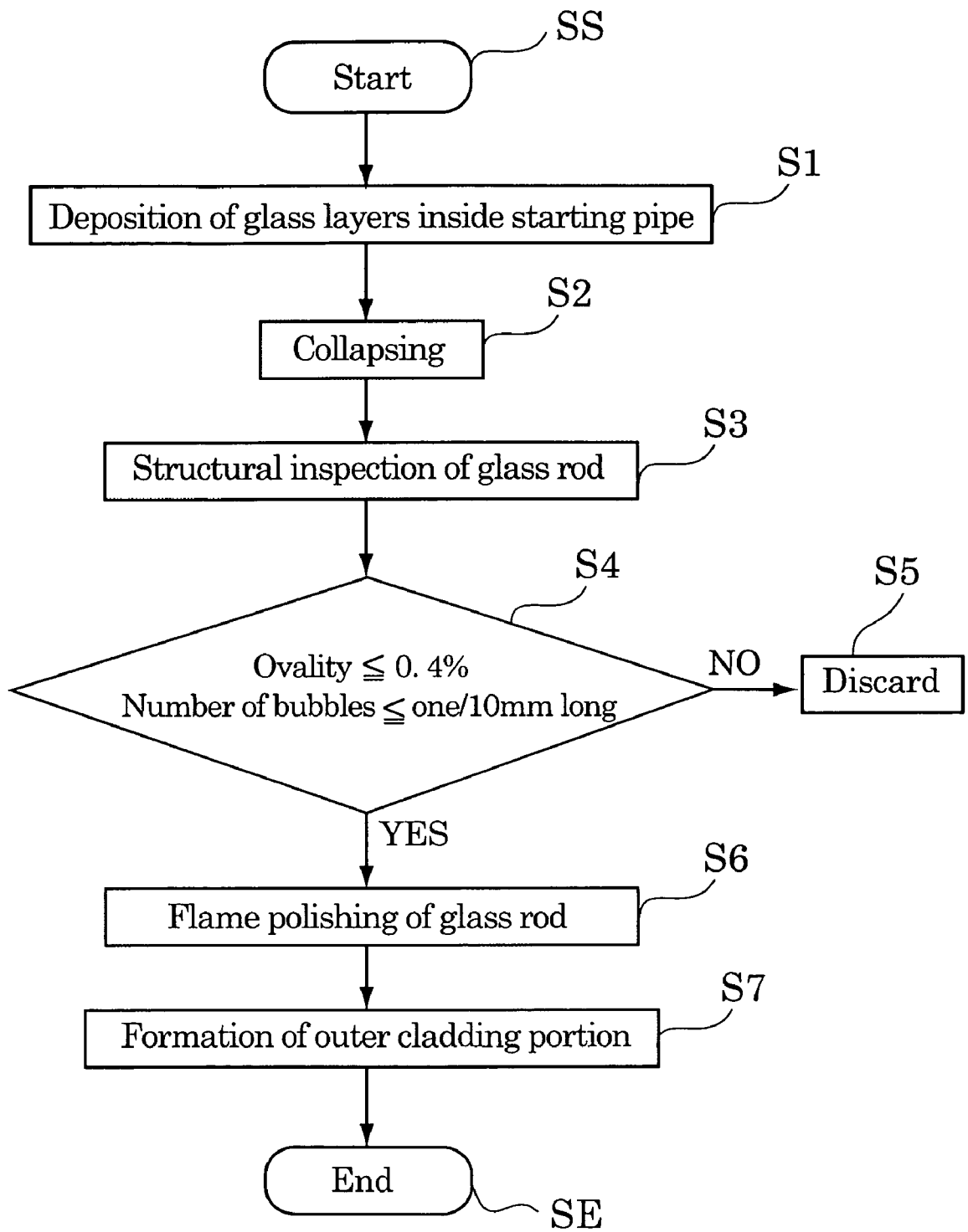
FIG. 3 is a flowchart showing the manufacturing steps of an optical fiber preform, illustrating a method according to an embodiment of the present invention.

FIG. 3 is a flowchart showing the manufacturing steps of an optical fiber preform, illustrating a method according to an embodiment of the present invention. In this embodiment, the central core 14, the first depressed portion 13, and the ring portion 12 of the optical fiber preform 1 are formed inside a starting pipe by an inside vapor phase deposition method, such as an MCVD method, which starting pipe is to be formed into the second depressed portion 11.

Figure 4:
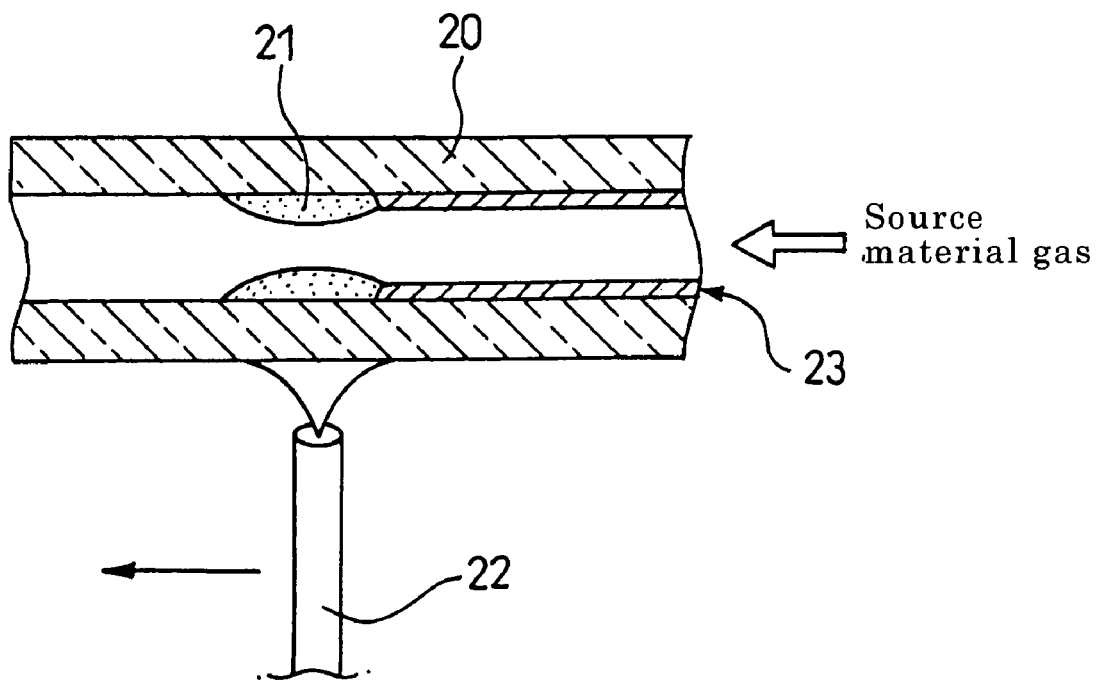
FIG. 4 is a schematic view for illustrating an MCVD method.

After the start (Step SS) of the manufacturing, glass layers are deposited inside the starting pipe (Step S1). For depositing the glass layers, an MCVD method may be used. FIG. 4 is a schematic view for illustrating an MCVD method. In the MCVD method, while source material gases (silicon tetrachloride ($SiCl_4$) and oxygen ($O_2$)) and helium (He) or the like are being fed inside a starting pipe 20, the outside of the starting pipe 20 is heated by a burner 22 or the like so as to deposit fine glass particles 21, followed by consolidation thereof, thereby forming a glass layer 23. In this embodiment, germanium (Ge) or one of phosphorus and chlorine (Cl) is first contained in the source material gases to form a glass layer to be formed into the ring portion 12. Next, fluorine is contained in the source material gases so as to form a glass layer to be formed into the first depressed portion 13. Subsequently, Ge or one of phosphorus and Ge is again contained in the source material gases so as to form a glass layer to be formed into the central core 14.

The starting pipe 20 is formed by depositing fine glass particles by a VAD (Vapor phase axial deposition) method, an OVD (Outside vapor phase deposition) method, or the like, followed by dehydration and consolidation, and the concentration of OH groups remaining in the starting pipe is 0.1 weight ppm or less and is more desirably 0.01 weight ppm or less. Accordingly, cost for the starting pipe can be reduced, and the loss due to absorption by the OH groups can be decreased in an optical fiber to be obtained.

Figure 14:
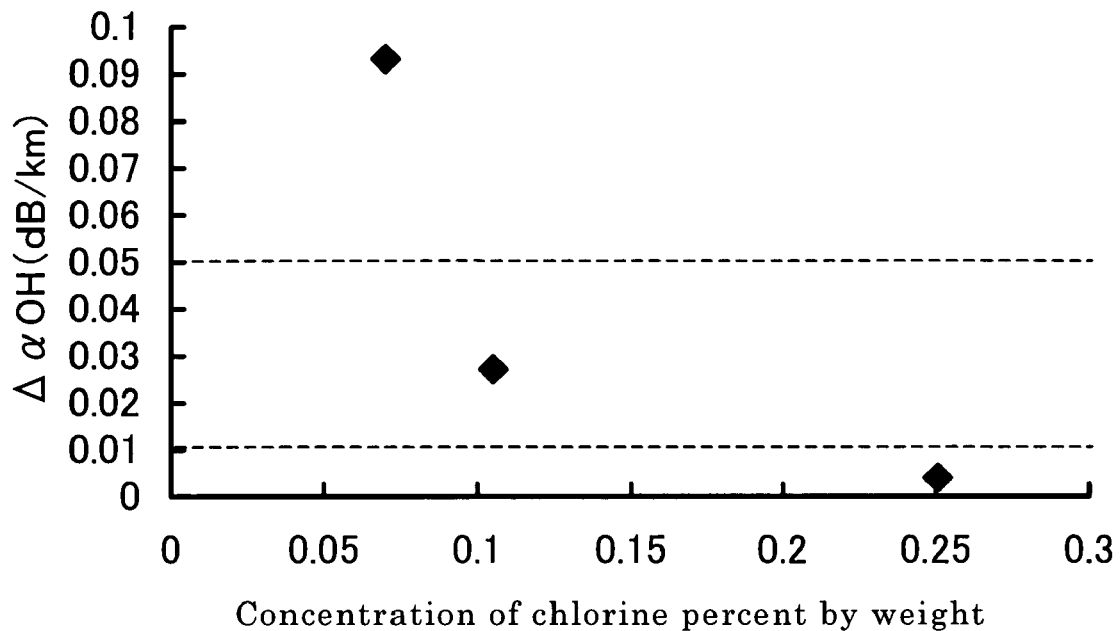
FIG. 14 is a graph showing relations between concentrations of chlorine in starting pipes and losses of optical fibers in a 1.4 μm band in the case where the optical fibers are manufactured using the starting pipes and the losses are due to the absorption by OH groups.

In the starting pipe 20, Cl used in the dehydration step remains. FIG. 14 is a graph showing the relationship between the concentration of Cl in a starting pipe and the loss of an optical fiber in a 1.4 μm band in the case where the optical fiber is manufactured using the starting pipe and the loss is due to the absorption by OH groups. The loss of an optical fiber in a 1.4 μm band due to the absorption by OH groups can be decreased to 0.05 dB/km or less when dehydration is performed under conditions in which 0.1 percent by weight of chlorine is allowed to remain, and it can be decreased to 0.01 dB/km or less in the case where dehydration is performed under conditions in which 0.25 percent by weight of chlorine is allowed to remain. In dehydration, a material such as $SiCl_4$ reactive with $O_2$ is also preferably contained in addition to chlorine ($Cl_2$).

The starting pipe 20 has an outside diameter in the range of 20 to 150 mm and a wall thickness in the range of 2 to 8 mm. When the outside diameter is set in the range of 20 to 150 mm, a large optical fiber preform can be manufactured.

Figure 15:
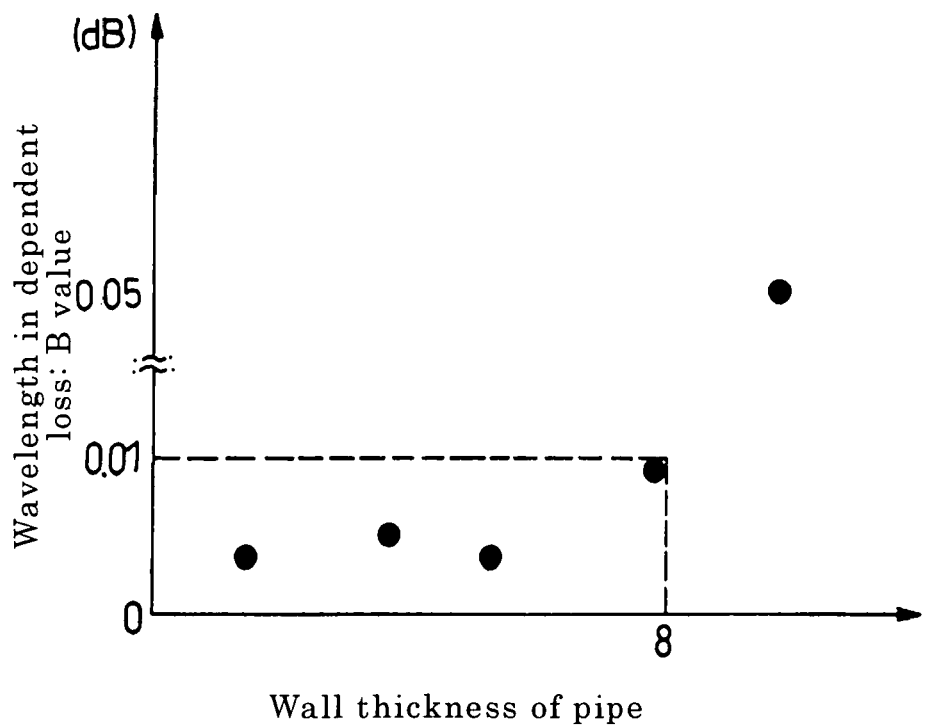
FIG. 15 is a graph showing relations between wall thicknesses of starting pipes and wavelength-independent components of loss of optical fibers.

FIG. 15 is a graph showing relations between wall thicknesses of starting pipes and wavelength-independent components, so-called B values, of loss of optical fibers. As shown in FIG. 15, when the wall thickness of the pipe is set to 8 mm or less, boundary surfaces between the individual glass layers formed in the pipe become smooth, and as a result, the B value can be decreased. In addition, when the wall thickness of the pipe is set to 2 mm or more, the pipe is prevented from being formed into an oval shape in a subsequent collapsing step.

The starting pipe 20 is preferably a pipe made of silica glass to which fluorine is added. As for a method of manufacturing fluorine-containing silica glass, a body formed by depositing fine glass particles is preferably consolidated in a gas atmosphere containing at least fluorine atoms or a compound including fluorine. Alternatively, consolidation is preferably performed in an atmosphere in which helium is added to a gas containing at least fluorine atoms or a compound including fluorine. By the addition of helium, the amount of fluorine to be added into the glass can be adjusted.

In addition, the unevenness of the wall thickness of the starting pipe 20 is preferably 0.3% or less along the entire length thereof, and the non-circularity of the inside diameter and that of the outside diameter of the starting pipe 20 are each preferably 1% or less. The term "unevenness of the wall thickness" as used herein is defined by ((maximum thickness of the pipe)-(minimum thickness of the pipe))/(average thickness of the pipe). Likewise, the non-circularity is defined by ((maximum diameter)-(minimum diameter))/(average diameter), where a circumferential shape of a cross-section of the pipe is regarded approximately as an oval. Under the above-mentioned conditions, an optical fiber having a small polarization mode dispersion (PMD) can be easily obtained.

Table I shows the results of consolidation done in the cases where fine glass particles containing germanium oxide were deposited inside pipes in which the unevenness of the wall thickness is different from each other.

TABLE I

| Sample No. | Unevenness of wall thickness % | Pipe surface heating temperature in consolidation ° C. | Result |
| --- | --- | --- | --- |
| 1 | 0.05 | 1,795 | Good |
| 2 | 0.15 | 1,800 | Good |
| 3 | 0.29 | 1,805 | Good |
| 4 | 0.35 | 1,820 | Bubbles Partly Generated |
| 5 | 0.5 | 1,880 | Bubbles Generated |

Even if the average wall thickness of a pipe is equal, the wall thickness differs pending on a position, and if the unevenness of the wall thickness is significant, a higher temperature is required for consolidating a fine glass particle layer at a side having a larger wall thickness. When the unevenness of the wall thickness is more than 0.3%, a superior glass film cannot be formed because monoxide germanium contained in the fine glass particles are foamed with a temperature required for the consolidation exceeding 1,820° C.

Table II shows the PMDs of samples 11 to 19 in which the unevenness of wall thickness, core eccentricity, and core non-circularity are different from each other.

TABLE II

| Sample No. | Core Eccentricity % | Unevenness of Wall Thickness % | Core Non-circularity % | PMD ps/√km |
| --- | --- | --- | --- | --- |
| 11 | 0.5 | 0.11 | 0.2 | 0.02 |
| 12 | 0.5 | 0.11 | 1.5 | 0.16 |

TABLE II-continued

| Sample No. | Core Eccentricity % | Unevenness of Wall Thickness % | Core Non-circularity % | PMD ps/√km |
|---|---|---|---|---|
| 13 | 1.3 | 0.11 | 0.2 | 0.19 |
| 14 | 0.6 | 0.25 | 0.8 | 0.08 |
| 15 | 0.6 | 0.25 | 1.3 | 0.22 |
| 16 | 1.1 | 0.25 | 0.8 | 0.19 |
| 17 | 0.4 | 0.35 | 0.8 | 0.21 |
| 18 | 0.4 | 0.35 | 1.6 | 0.19 |
| 19 | 1.3 | 0.35 | 0.5 | 0.33 |

The term "core eccentricity" as used herein is defined by ((a distance between the center of the rod and the center of the core)/(the radius of the rod)). As shown in Table II, when the unevenness of the wall thickness, the core eccentricity, and the core non-circularity are respectively set to have an average value of 1.5% or less in the axial direction, the PMD could be reduced to 0.15 ps/km$^{1/2}$ or less.

In addition, it is preferable that the thickness of the glass layer 23 deposited in Step S1 be 1 mm or more, and that the total thickness (thickness of a pipe having a glass layer to be formed into the core) of the starting pipe 20 and the glass layer 23 be 8 mm or less. When the thickness of the glass layer to be formed is less than 1 mm, it is difficult to obtain an optical fiber preform that can be drawn into a long optical fiber having a length of 400 km or more. In addition, when the total thickness of the starting pipe 20 and the glass layer 23 is more than 8 mm, the temperature at a surface on which the glass layer is deposited is considerably changed between the start and the end of the deposition. As a result, the concentration of an additive may be deviated from a desired value, or a glass layer having a uniform thickness may become difficult to be formed.

Figure 19:
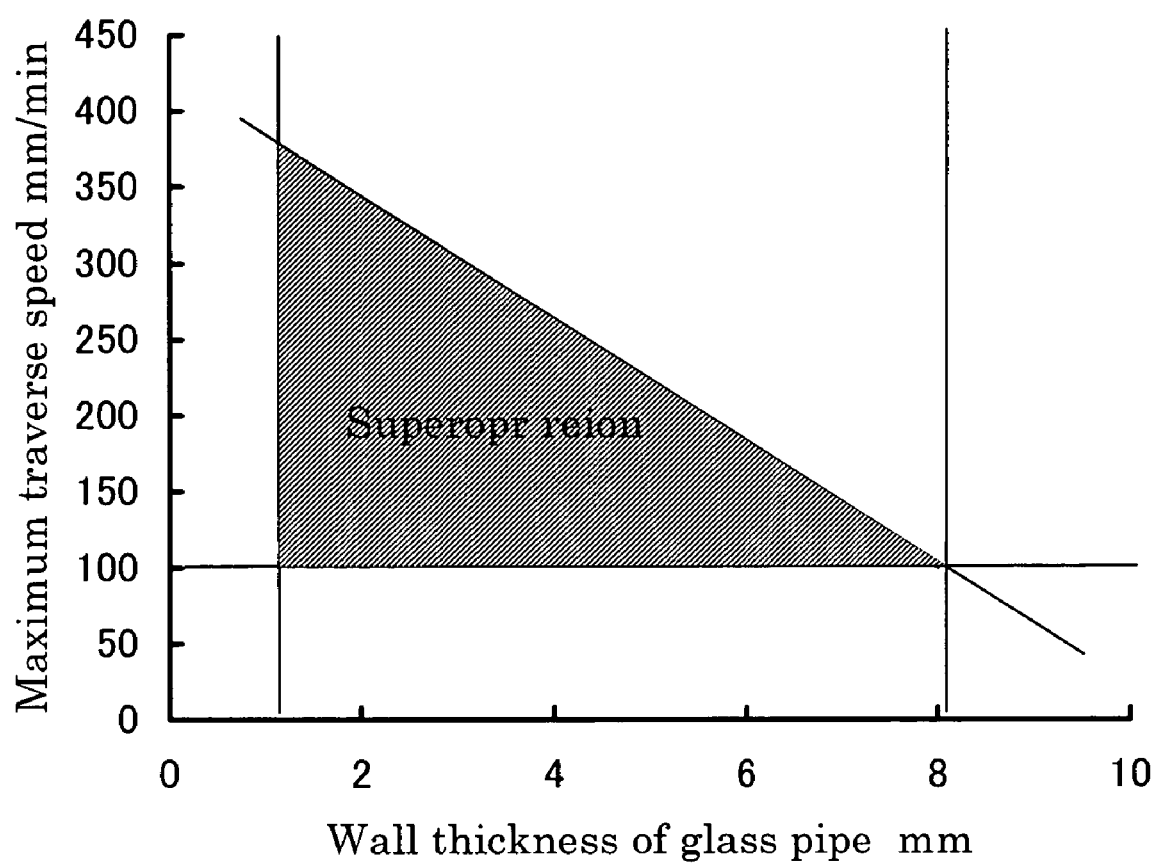
FIG. 19 is a graph for illustrating the relation among the wall thickness of a glass pipe, a traverse speed of a burner, and the state of a glass layer deposited inside.

In addition, when the total thickness of the starting pipe 20 and the glass layer 23 is increased, in order to deposit a superior glass layer, the burner 22 must be moved at a slow traverse speed. FIG. 19 is a graph illustrating the relationship among a wall thickness of a glass pipe, a burner traverse speed, and the state of a glass layer deposited inside the glass pipe. The pipe used in this embodiment has a diameter of 42 mm, and the deposition rate of the glass layer is 1.5 g/min. In this case, when the traverse speed is too slow, the deposition amount of fine glass particles per one layer becomes excessively large, and the fine glass particles cannot be consolidated; hence, the traverse speed must be set to 100 mm/min or more regardless of the wall thickness of the glass pipe. For example, when fine glass particles are deposited inside a glass pipe having a thickness of 5 mm, a superior glass layer having a surface roughness of 10 nm can be obtained at a traverse speed of the burner of 100 to 220 mm/min. When the wall thickness of the glass pipe is more than 8 mm, a superior glass film cannot be obtained regardless of the traverse speed. For example, when the wall thickness of the glass pipe is 10 mm, the surface roughness of the layer is over 100 nm.

When the surface roughness of the glass layer increases, the B value of the transmission loss of an optical fiber increases. Hence, for forming an optical fiber having a small transmission loss, the total thickness of the starting pipe 20 and the glass layer 23 is important.

Figure 5:
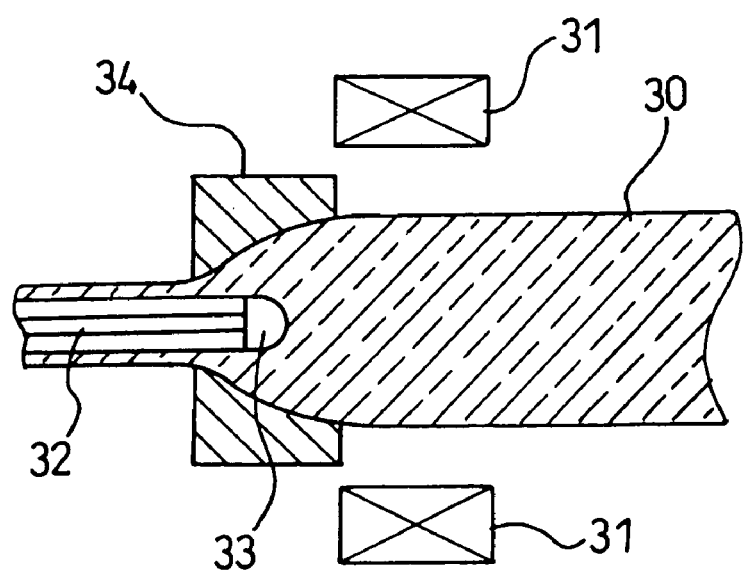
FIG. 5 is a schematic view for illustrating one example of a method of manufacturing a starting pipe.

FIG. 5 is a schematic view for illustrating a piercing method which is one example of a method of manufacturing a starting pipe. As shown in FIG. 5, a cylindrical silica glass rod 30 is inserted into heating means 31 such as a heater disposed so as to cover this silica glass rod and is then heated and softened at one end portion thereof (left end portion in FIG. 5). The silica glass rod is inserted into a dice 34 and is then fed to the left side in the figure by movable means which is not shown in the figure. Next, a head portion 33 of a piercing tool 32 is brought into contact with the center of an end surface of the heated and softened end portion of the silica glass rod 30. Subsequently, while the silica glass rod 30 is being fed, the head portion 33 is inserted inside the silica glass rod 30 so that the head portion 33 of the piercing tool 32 penetrates the silica glass rod 30 in the axial direction thereof, thereby obtaining a silica glass pipe.

Figure 16:
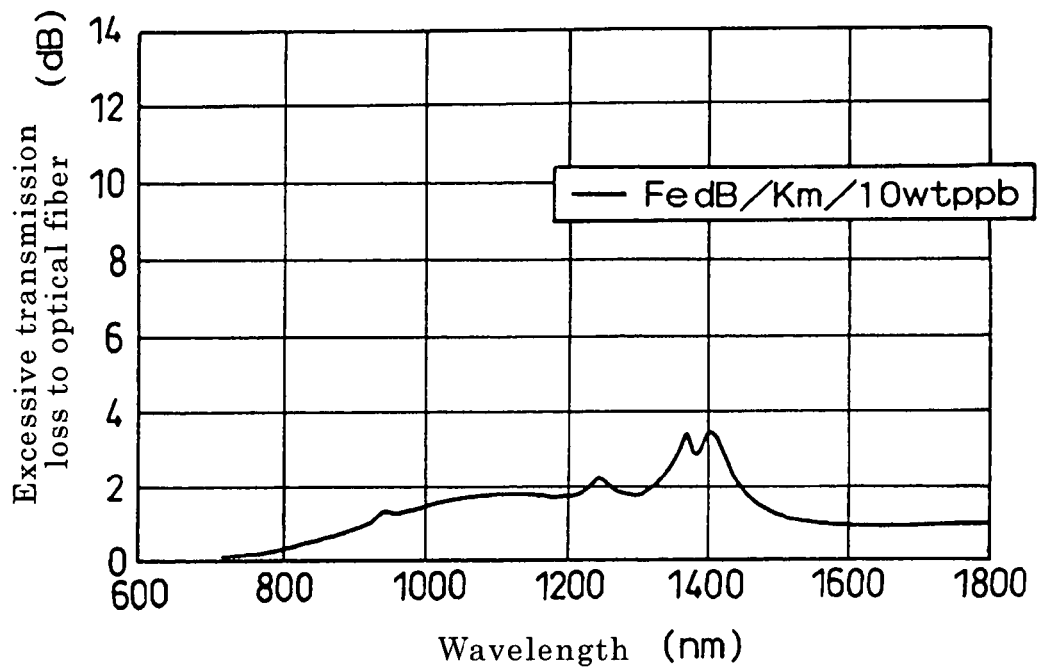
FIG. 16 is a graph showing one example of an absorption spectrum of a transition metal.

FIG. 16 is a graph showing the absorption spectrum of an optical fiber containing 10 weight ppb of iron in a region through which light is transmitted. As shown in FIG. 16, even when a small amount of impurity is present in a region through which light is transmitted, the loss in a transmission band increases. Hence, when the pipe is formed by a piercing method, the piercing tool 32 is preferably a high purity carbon rod having a purity of 99 percent by weight or more, for example, so that the concentration of impurity other than additives is decreased at the inner wall of the pipe. Accordingly, mingling of metal impurities such as iron, chromium, and nickel can be prevented when the silica glass pipe is formed by piercing, and as a result, an increase in loss of an optical fiber can be prevented. The concentration of impurity other than the additives at the inner wall of the pipe is desirably set to 1 weight ppm or less. The concentration of impurity is more desirably set to 10 weight ppb or less. In this case, the inner wall of the pipe is defined as a region from the inner surface of the pipe to a depth of 1 mm therefrom.

Instead of the piercing method, a hole may be formed in a silica glass rod with a drill having a blade. However, the piercing method can be performed at a high hole-forming rate, such as several tens mm/min, as compared to such a drilling method, and in addition, it can avoid the loss of a glass material that may be caused by the drilling.

The inner surface of the glass pipe thus formed is preferably processed by vapor phase etching before inside vapor phase deposition is performed. By this etching, foreign materials, OH layers, and the like adhering to the inner surface of the pipe can be removed.

In Step S1, the rate of depositing the glass layer 23 is desirably set to 0.4 g/min or more. More desirably, the rate is set to 1.0 g/min or more. Accordingly, the optical fiber preform and the optical fiber can be manufactured at low cost.

The heat source of an MCVD method may be an oxyhydrogen burner, a resistance furnace, a plasma torch, or an induction furnace. Preferably, an induction furnace, a resistance furnace, or a plasma torch is used. Use of such a non-moisture-generating heat source makes it possible to produce an optical fiber having a small loss due to the absorption by OH groups in a 1.4 μm wavelength band. When a resistance furnace or an induction furnace is used, heating may be performed while a dry gas is being filled in the furnace. In the case where a plasma torch is used, a gas for a working gas may be oxygen, nitrogen, argon, or a mixture thereof, with the dew points of the gas being decreased beforehand by passing through a commercially available adsorption filter.

In the case of the inside vapor phase deposition method, in order to increase the deposition rate, the inside of the starting pipe must be sufficiently heated. Hence, the wall thickness of the starting pipe should preferably be decreased. However, when an oxyhydrogen burner is used as the heat source, the heat source generates moisture while heating the periphery of the starting pipe, and accordingly, OH group absorption increases as the wall thickness of the starting pipe is decreased.

When a starting pipe containing fluorine is used, a non-moisture-generating heat source is preferably used. For example, when a non-moisture-generating heat source was used, the loss of an optical fiber at a wavelength of 1.38 μm due to the absorption by OH groups was 0.11 dB/km in both of the case where fluorine is contained in the starting pipe and the case where no fluorine is contained in the starting pipe (each pipe having an outside diameter of 25 mm and an inside diameter of 17 mm). On the other hand, when inside vapor phase deposition using an oxyhydrogen burner was performed for a starting pipe containing 0.2 weight ppm of fluorine, the loss at a wavelength of 1.38 μm due to the absorption by OH groups was 0.8 dB/km, and when inside vapor phase deposition using an oxyhydrogen burner was performed for a starting pipe containing no fluorine (chlorine concentration was 200 weight ppm), the loss at a wavelength of 1.38 μm due to the absorption by OH groups was 0.5 dB/km.

Figure 6:
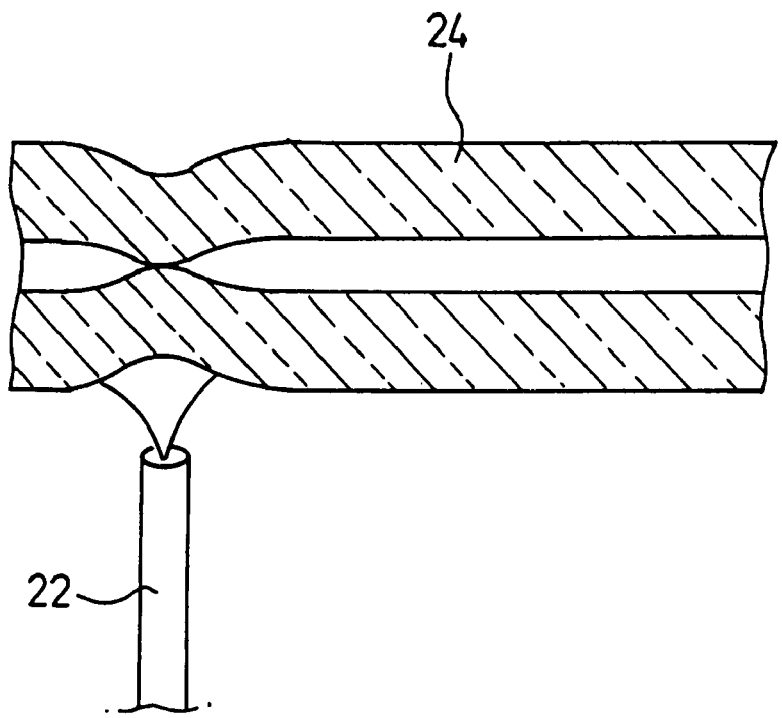
FIG. 6 is a schematic view illustrating the first heating step.
Figure 7:
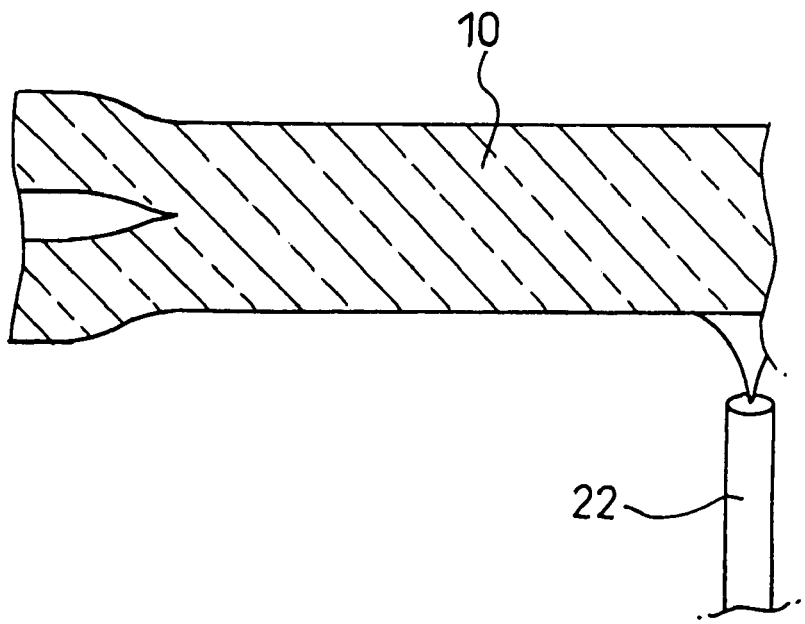
FIG. 7 is a schematic view illustrating the second heating step.

The glass pipe thus formed is collapsed to form a glass rod (Step S2 in FIG. 3). Step S2 has a first heating step of heating and collapsing one end portion of a pipe having a glass layer to be formed into a core and a second heating step of heating and collapsing the pipe having a glass layer to be formed into a core from one end portion to the other end. FIG. 6 is a schematic view illustrating the first heating step, and FIG. 7 is a schematic view illustrating the second heating step.

When the collapsing is performed, as shown in FIG. 6, a heat source (in this case, the burner 22 emitting oxyhydrogen flame is shown by way of example) heats a glass pipe 24 so as to collapse first at a part that is near an end portion of the effective part to be used as the glass rod. Subsequently, as shown in FIG. 7, from the first collapsed part to the other end, the burner 22 and the glass pipe are caused to relatively move so that the glass pipe is sequentially collapsed. Thus, a glass rod 10 is formed.

A surface heating temperature T1 of the one end portion in the first heating step is preferably set higher than a surface heating temperature T2 of the heated part of the pipe in the second heating step, the pipe having a glass layer to be formed into the core. For example, in the case of a starting pipe containing 2 weight ppm of fluorine, T1=1,250° C. and T2=1,150° C. are suitable. Under such conditions, the pipe can be quickly collapsed when the collapsing is started, that is, when the sealing of the pipe is done, and in subsequent collapsing, the pipe can be collapsed at an appropriate speed. Accordingly, the central core and the entire glass rod can be prevented from being deformed, which suppresses non-circularity in the formation of core and cladding, and consequently, an optical fiber having a small PMD can be obtained.

In addition, when the collapsing is performed, it is preferable that, the absolute pressure inside the pipe being collapsed be 10 kPa or less, and the pipe surface heating temperature be in the range of 1,000 to 1,600° C. When the pressure inside the pipe is decreased lower than the atmospheric pressure, the amount of moisture present in the pipe can be reduced, thereby lessening the loss in a 1.4 μm wavelength band due to the absorption by OH groups; in addition, the collapsing speed can be increased.

A heat source to be used for the collapsing may be an induction furnace, a resistance furnace, oxyhydrogen flame, or a plasma torch. Among those mentioned above, a non-moisture-generating heat source such as an induction furnace, a resistance furnace, a plasma torch is preferably used.

In particular, when a starting pipe containing fluorine is used, a non-moisture-generating heat source is preferably used.

As described above, when the heat source used for the inside vapor phase deposition or the collapsing is a non-moisture-generating heat source, the concentration of OH groups present in a region from the surface of the glass rod to a depth of 1 mm therefrom can be decreased to 10 weight ppm or less. Furthermore, the concentration of OH groups can be decreased to 1 weight ppm or less. In addition, when a glass layer to which moisture adheres is removed in order to decrease the loss due to the absorption by OH groups, the amount of the removal can be decreased. Accordingly, a superior optical fiber preform and optical fiber can be manufactured at low cost.

Figure 20:
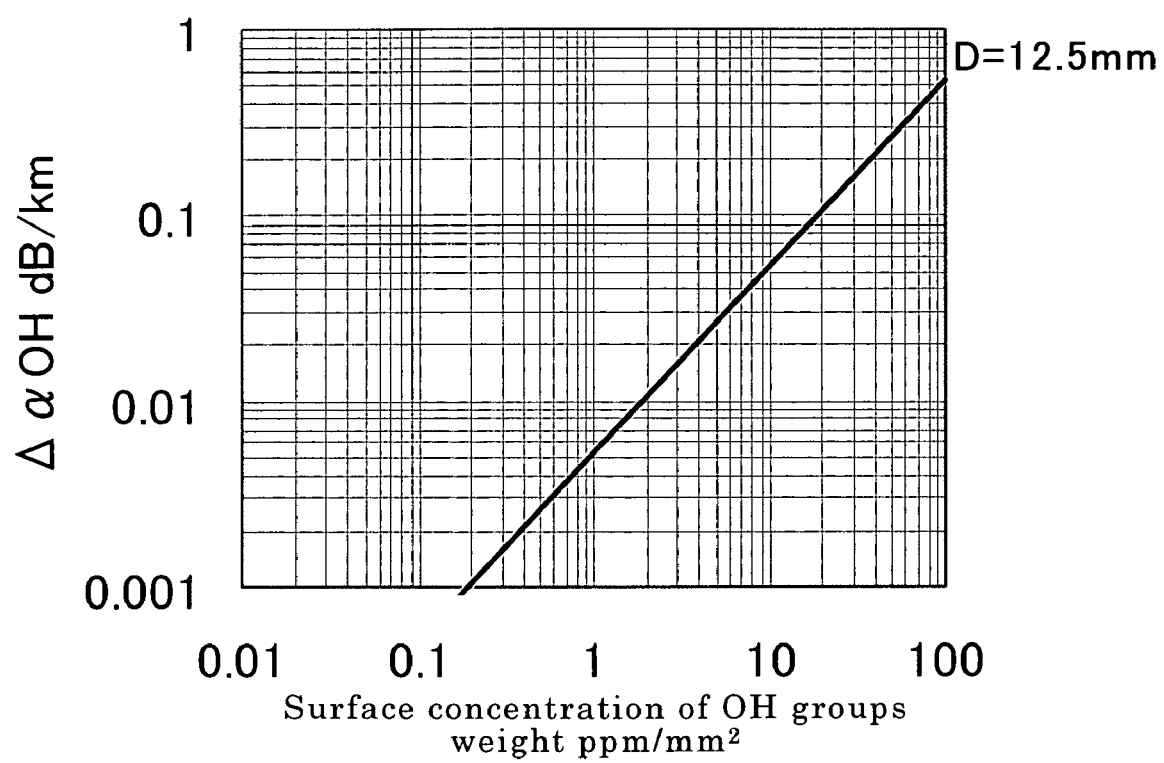
FIG. 20 is a graph showing a result of calculation about a relation between concentrations of OH groups on the surface of glass rods and losses in a 1.4 μm band due to absorption by OH groups.

FIG. 20 is a graph showing the relation between the concentration of OH groups on the surface of the glass rod and the loss in a 1.4 μm band due to the absorption by OH groups. In this case, permeation of an optical power to the surface of the glass rod is assumed to be 2%. When the concentration of OH groups is set to 10 weight ppm or less, the loss in a 1.4 μm wavelength band due to the absorption by OH groups is 0.05 dB/km or less. This value is equivalent to that required for a low OH fiber.

Figure 8:
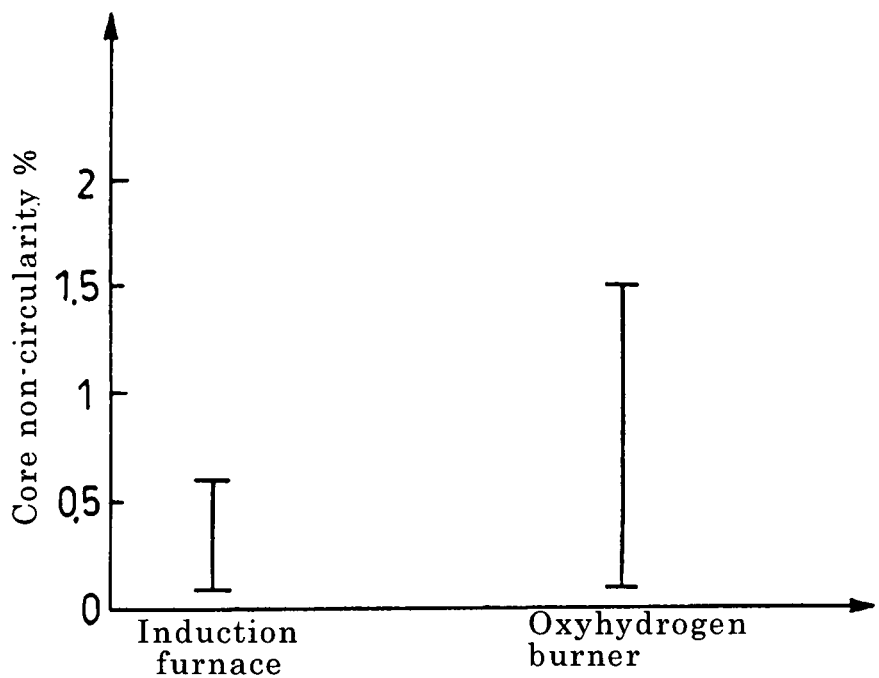
FIG. 8 is a graph showing the relationship between a core non-circularity and types of heat sources used for collapsing.

As the heat source, in particular, an induction furnace is preferably used. FIG. 8 is a graph showing the relation between the core non-circularity and types of heat sources used for collapsing. In the case of an induction furnace which can uniformly heat the pipe along the entire periphery thereof and uniformly soften the entire periphery of the glass, the core non-circularity can be decreased as compared to the case of an oxyhydrogen burner which can heat the pipe only from one side thereof.

When a collapse of the glass pipe is performed, dehydration and baking are preferably performed at a pipe surface heating temperature of 800° C. or more while $Cl_2$ at a flow rate of 0.1 slm (standard liter/min) or more is being introduced inside the glass pipe. Accordingly, moisture adsorbed on the inner wall of the glass pipe can be removed. In addition, before the collapsing is performed, the inner surface of the pipe is preferably processed by vapor phase etching. Accordingly, foreign materials and OH layers adhering to the pipe surface can be removed.

Figure 9:
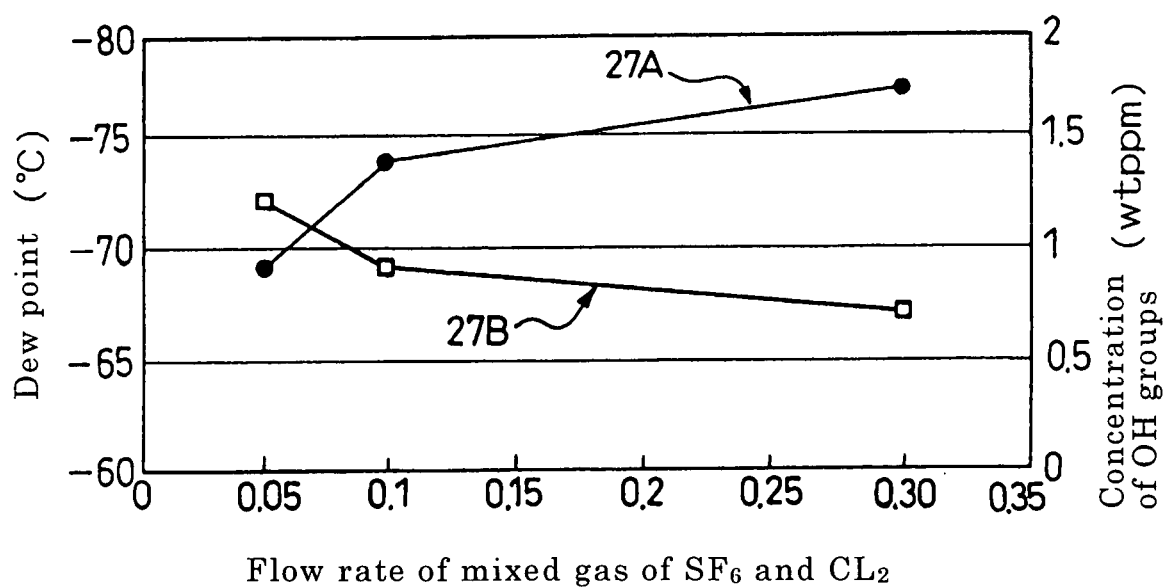
FIG. 9 is a graph showing, with respect to a mixed gas of sulfur hexafluoride ($SF_6$) and chlorine ($Cl_2$), the relationship between its flow rates and its dew points as well as the relationship between its flow rates and the concentrations of OH groups.

FIG. 9 is a graph showing, with respect to a mixed gas of sulfur hexafluoride ($SF_6$) and chlorine ($Cl_2$), the relationship between its flow rates and its dew points as well as the relationship between its flow rates and the concentrations of OH groups. In FIG. 9, a line 27A shows the relation between the flow rate of the mixed gas and the dew point thereof, and a line 27B shows the relation between the flow rate of the mixed gas and the concentration of OH groups. As shown in FIG. 9, by increasing the flow rate of the mixed gas of $SF_6$ and $Cl_2$, the dew point can be decreased, and the concentration of OH groups can be decreased. The reason for this is that as the flow rate of the mixed gas increases, the diffusion of moisture from the downstream side can be prevented. The content of moisture in the gas itself is also preferably less than 10 ppb. In etching, it is preferable that $Cl_2$ and $SF_6$ be allowed to flow at flow rates of 0.1 slm or more and 50 sccm (standard cubic centimeter/minute) or more, respectively, and that the pipe surface heating temperature be set to 1,500° C. or more. Accordingly, foreign materials and OH layers adhering to the pipe surface can be removed.

When the core non-circularity of an optical fiber preform is high, the PMD obtained upon drawing increases, and accordingly the quality of transmission signal is degraded.

In addition, when many bubbles are contained in the glass rod along the central axis thereof, the bubbles expand in a subsequent heating step such as a drawing step, thereby blocking the central core such that the transmission loss of signal light increases or transmission of signal light is interrupted. Also, the mechanical strength of an optical fiber decreases at its point where many bubbles are present.

Hence, the glass rods obtained by collapsing are inspected, as a structural inspection (Step S3 shown in FIG. 3), with respect to the number of bubbles and the core non-circularity. A glass rod is judged to cause inconvenience in a drawing step if it has more than one bubble per 10 mm length along the central axis of the glass rod or has a core non-circularity of 0.4% or more (Step S4), and such glass rod is not used (Step S5). In addition, if a glass rod has an non-circularity of 1.5% or more at its part where deposition has been done using an inside vapor phase deposition method, it is more desirable to decide that such glass rod may cause inconvenience in a subsequent step and not to use it.

Figure 10:
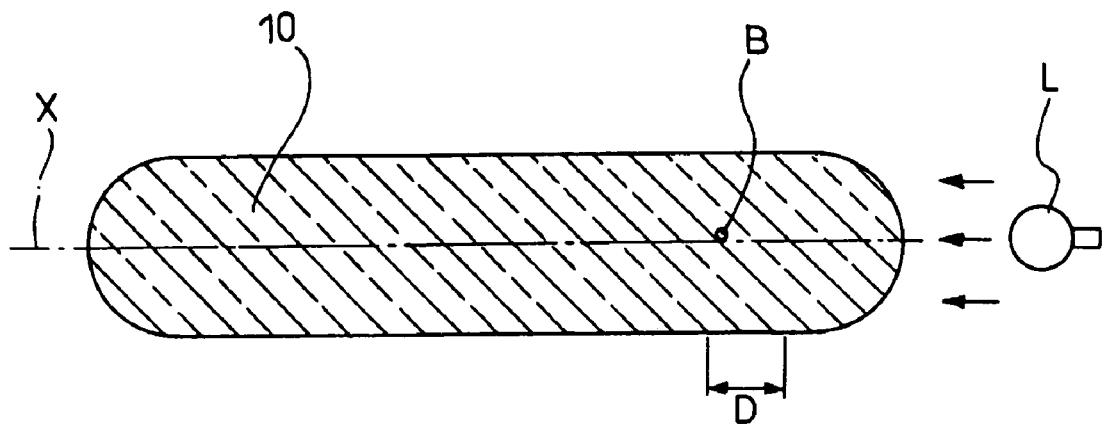
FIG. 10 is a schematic view for illustrating a method of measuring the number of bubbles present in a glass rod.

FIG. 10 is a schematic view for illustrating a method of measuring the number of bubbles present in a glass rod. Light is radiated to the glass rod 10 from one direction using a light source L such as a halogen lamp, and the number of bubbles B present on a central axis X of the glass rod 10 is measured by eye inspection. Subsequently, in the case where one or more bubbles B are present per 10 mm length along the central axis of the glass rod 10, an area D that contains the bubbles B is discarded.

Figure 11:
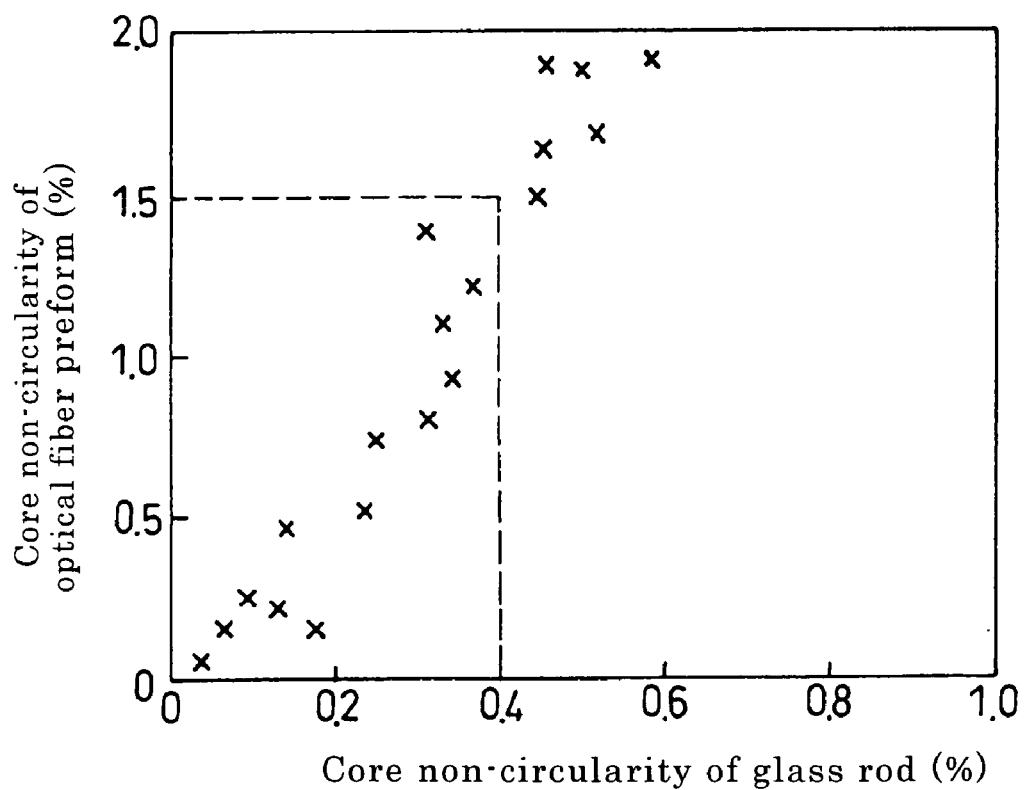
FIG. 11 is a graph showing relations between core non-circularities of glass rods and core non-circularities of optical fiber preforms.

FIG. 11 is a graph showing relations between core non-circularities of glass rods and core non-circularities of optical fiber preforms. As shown in FIG. 11, a glass rod having a core non-circularity of more than 0.4% tends to be formed into an optical fiber preform having a core non-circularity of more than 1.5% as a result of a high temperature treatment step for forming a jacket portion or the like. In addition, when the non-circularity of a glass rod at a part formed by deposition using an inside vapor phase deposition method is set to 1.5% or less, the core non-circularity of an optical fiber preform can be easily set to 1.5% or less.

Figure 12:
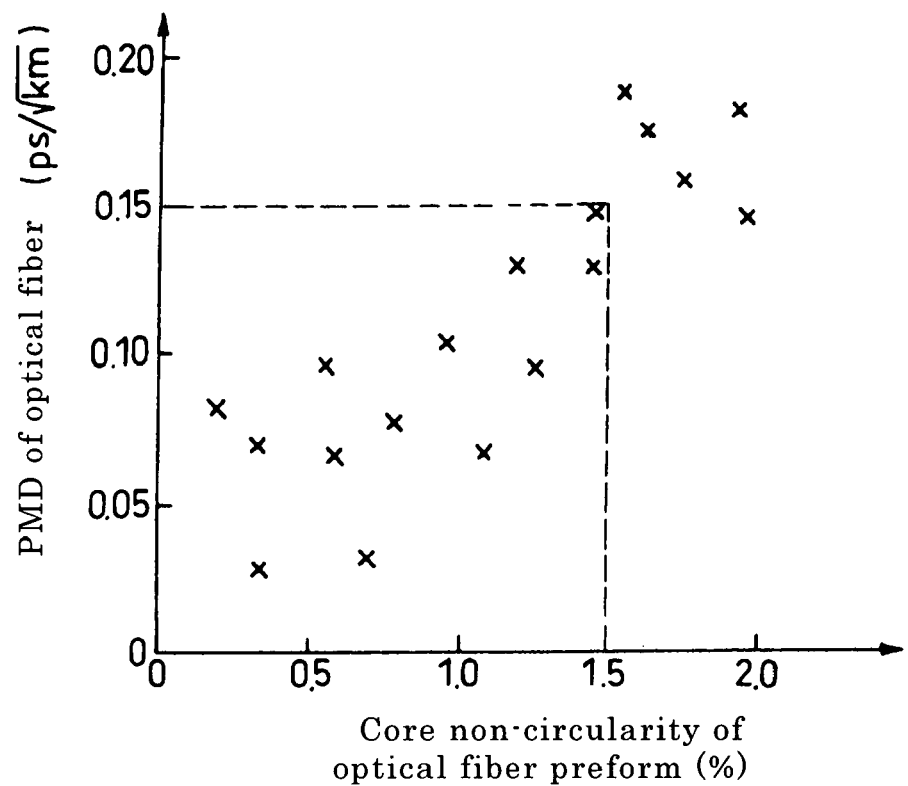
FIG. 12 is a graph showing relations between core non-circularities of optical fiber preforms and polarization mode dispersions of optical fibers.

FIG. 12 is a graph showing relations between core non-circularities of optical fiber preforms and PMDs of optical fibers. As shown in FIG. 12, when having a core non-circularity of more than 1.5%, the optical fiber preform is liable to be formed into an optical fiber having a PMD of more than 0.15 ps/km$^{1/2}$. In general, for high speed optical communication exceeding 40 Gb/s, an optical fiber having a PMD of 0.15 ps/km$^{1/2}$ or less has been required. By using only glass rods having a core non-circularity of 0.4% or less, optical fibers having a superior PMD and applicable to high speed optical communication can be efficiently manufactured.

After the structural inspection has been completed, the glass rod may be treated by flame polishing around the periphery thereof (Step S6 in FIG. 3). By the flame polishing, a surface layer of the glass rod is vaporized so as to remove damages or strains present on the surface or so as to remove foreign materials adhering thereto, and hence a high quality glass rod can be obtained.

In addition, a jacket portion to be formed into an outer cladding is formed around the periphery of the glass rod so as to produce an optical fiber having designed properties as well as desired core diameter and outside diameter (Step S7 in FIG. 3). Hence, the jacket portion may be manufactured, for example, by a VAD method an OVD method, or an outside vapor phase deposition method using a plurality of burners, and thereby the cost of the process can be reduced.

By the steps described above, the manufacturing is completed (Step SE in FIG. 3), and an optical fiber preform can be obtained which is capable of forming an optical fiber having a desired refractive index profile and a small loss due to the absorption by OH groups.

When the optical fiber preform thus obtained is drawn to form an optical fiber, drawing is preferably performed while the optical fiber is being twisted. Accordingly, the PMD can be decreased. In addition, when the drawing is performed, a tension applied to the optical fiber is preferably adjusted in the range of 30 to 300 g. Thus, variation in properties of the drawn optical fiber can be suppressed.

In addition, the diameter of glass upon drawing is desirably 90 to 250 μm. A diameter of 90 to 150 μm is more desirable. An optical fiber having an increased diameter is unlikely to be influenced by microbending.

Furthermore, the loss of an optical fiber at a wavelength of 1.38 μm due to the absorption by OH groups is desirably 0.2 dB/km or less and more desirably 0.1 dB/km or less. Furthermore, a loss of 0.05 dB/km or less or 0.01 dB/km or less is even more desirable. As described above, by applying a non-moisture process to collapsing and inside vapor phase deposition, an optical fiber is allowed to have a small OH absorption loss.

Instead of the above-described methods for Step S7 shown in FIG. 3, a glass rod may be inserted into a jacket pipe and drawing may be performed simultaneously while the glass rod is being unified with the jacket pipe. In this case, the jacket pipe to be used is a pipe formed by the steps of depositing fine glass particles by an OVD method, consolidating the particles thus deposited, and forming a hole therein by a piercing method.

Figure 13:
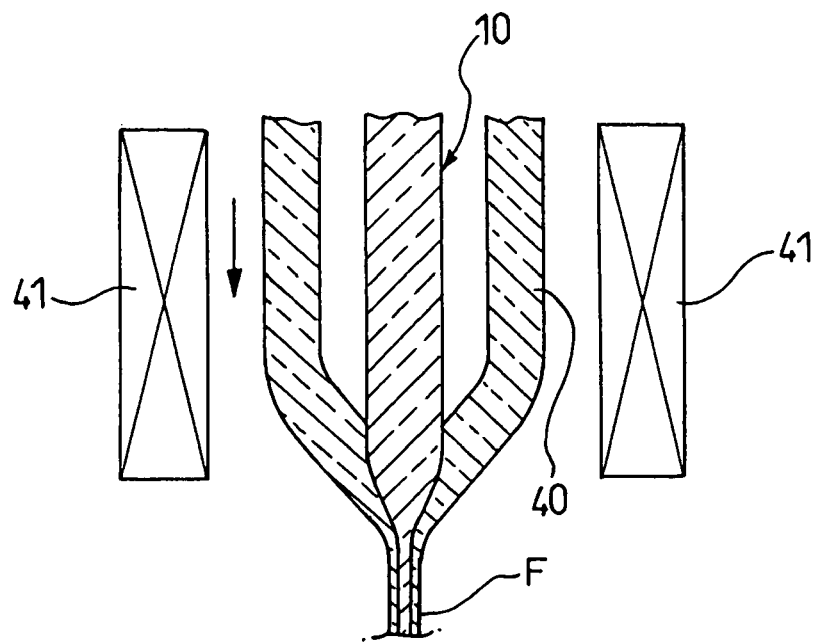
FIG. 13 is a schematic view for illustrating a method of performing drawing while a glass rod inserted into a jacket pipe is being unified with the jacket pipe.

FIG. 13 is a schematic view for illustrating a method of performing drawing while a glass rod inserted into a jacket pipe is being unified with the jacket pipe. In the state in which the glass rod 10 is inserted into a jacket pipe 40 having a cylindrical shape, the glass rod 10 and the jacket pipe 40 are both heated by heating means 41 such as a heater. A temperature at a lower end side (lower side portion in FIG. 13) of the heater is set higher than that at an upper end side. Subsequently, while the glass rod 10 and the jacket pipe 40 are being unified by heating at their lower end side and are melted so as to be drawn downward by applying a tension, so that an optical fiber F is formed. In addition, during the drawing, the glass rod 10 and the jacket pipe 40 are fed in a direction indicated by an arrow shown in FIG. 13. In this embodiment, a heater described as an example of a heating means 41 is one which generates heat by flowing an electric current through a resistance material; however, a susceptor heated by an induction current or plasma may also be used. A plurality of heaters may be disposed in the axial direction (a vertical direction in FIG. 13) of the glass rod 10. When the drawing step is accomplished in a state where the glass rod is inserted into the jacket pipe as described above, no moisture adheres to the interface even if the structure is such that light is permeated to the outer cladding, and hence an optical fiber having a small OH absorption can easily be manufactured.

EXAMPLE 1

Example 1 relates to methods of manufacturing an optical fiber preform having a refractive index profile shown in FIG. 2 and an optical fiber. The relative refractive index differences $\Delta c$, $\Delta d1$, $\Delta r$, and $\Delta d2$ of an optical fiber preform manufactured in Example 1 are 0.50%, −0.30%, 0.27%, and −0.15%, respectively. In addition, a ratio Ra of the diameter 2c of the central core 14 to the outside diameter 2d1 of the first depressed portion 13 is 0.66, a ratio Rb of the outside diameter 2d1 of the first depressed portion 13 to the outside diameter 2r of the ring portion 12 is 0.57, and a ratio Rc of the outside diameter 2r of the ring portion 12 to the outside diameter 2d2 of the second depressed portion 11 is 0.50. In the optical fiber manufactured in Example 1, the ratio of light transmitted through the outside of the second depressed portion 11 is 2%.

In order to manufacture the optical fiber preform as described above, first, a starting pipe to be formed into the second depressed portion 11 was made by a VAD method and piercing method. This starting pipe has an outside diameter of 32 mm, an inside diameter of 26 mm, and a length of 1,900 mm, and is a fluorine-containing silica glass pipe in which the relative refractive index difference with respect to a pure silica glass is −0.15%. The content of OH groups in this starting pipe was 0.01 weight ppm or less. In addition, this pipe was formed such that the unevenness of the wall thickness over the entire length was 0.3% or less and the individual value of the pipe eccentricity, the non-circularity of the outside diameter, and the non-circularity of the inside diameter were 1% or less respectively over the entire length.

Next, vapor phase etching was performed by heating and by causing a mixed gas of $SF_6$ and $Cl_2$ to flow inside the starting pipe. Subsequently, deposition of glass layers was performed by an MCVD method so that the deposited glass layers were formed into a ring portion 12 containing germanium, a first depressed portion 13 containing fluorine, and the central core 14 containing germanium such that the refractive index profile described above were obtained.

In order to deposit glass by an MCVD method at a deposition rate of 2 g/min, the burner traverse speed must be increased to 150 mm/min, for example; fine glass particles must be deposited so as to form a thick layer with such a traverse speed; and the fine glass particles thus deposited must be consolidated. For this purpose, it is important to heat the pipe in a wide rage (such as 50 mm or more) to a high temperature (such as 2,200° C.), while preventing the deformation of the pipe. In the cases of a plasma burner, an induction furnace, and a resistance furnace, since their calorific power can be increased by increasing supplied electric power and a heating region can be broadened by designing a suitable furnace body, the problems described above can relatively easily be solved as compared with the case of an oxyhydrogen burner. In addition, in the case of an induction furnace or a resistance furnace, heating can be performed from every direction around the entire periphery of the pipe. In addition, in the case of a plasma torch, the flow rate of a gas projected therefrom can be decreased to $\frac{1}{10}$ to $\frac{1}{100}$ as compared to that of an oxyhydrogen burner. As a result, the heat sources described above can suppress the deformation of the pipe and can be more advantageously used when a glass deposition is performed at a high rate.

Next, this glass pipe was collapsed to form the glass rod 10. The diameter, the non-circularity, and the length of the glass rod were 12.5 mm, 0.2%, and 1,800 mm, respectively. When the number of bubbles in the glass rod 10 was measured with the method described in FIG. 10, a part having three bubbles per 10 mm length along the central axis was observed, and hence that part was discarded. The glass rod 10 exhibited a superior core non-circularity and core eccentricity, such as 0.1%. The outside surface of the glass rod 10 was processed by flame polishing.

Next, the outer cladding 15 was formed. The outer cladding 15 was formed by a VAD method, depositing fine glass particles composed of silica containing no dopant at a deposition rate of 100 g/min, and subsequently performing consolidation of the resulting deposit. The outer cladding 15 was formed so as to have a length of 1,280 mm and an outside diameter of 2.9 times the diameter of the glass rod 10. Furthermore, the core non-circularity of the outer cladding 15 upon formation thereof was 0.1%, and the non-circularity of the outer diameter of the outer cladding 15 was 0.2%.

An optical fiber was manufactured by drawing the optical fiber preform thus formed. The drawing speed and the drawing tension were set to 1,200 m/min and 50 g, respectively, and the drawing was performed while the optical fiber right after the drawing was being twisted. The length of the optical fiber obtained from one optical fiber preform was 685 km. When the properties of the optical fiber were inspected, the PMD was $0.11$ $ps/km^{1/2}$, and the B value was 0.01 dB/km or less. According to this example, a large optical fiber preform could be synthesized at a high speed, and a low-cost optical fiber preform could be formed.

EXAMPLE 2

In Example 2, rod-in-drawing was performed using a glass rod and a jacket pipe in combination, instead of forming a jacket portion around the glass rod and thereby forming an optical fiber preform as in Example 1. The jacket pipe was equivalent to that in the above-described embodiment and had an outer diameter of 130 mm and an inner diameter of 31 mm. The drawing conditions were the same as in Example 1.

In the case of the rod-in-drawing, which does not accompany a soot deposition for forming the jacket portion and no moisture diffusion otherwise caused by hydrolysis reaction at the interface will occur, the loss due to the absorption by OH groups can be suppressed to a lower level even in the case of a fiber that is designed to allow permeation of light to the interface of the jacket. Furthermore, an optical fiber having superior properties can be obtained at low cost, because the jacket pipe is formed by high speed synthesis. Accordingly, an optical fiber having superior properties, such as a loss of 0.05 dB/km due to the absorption by OH groups at a wavelength of 1.38 μm, could be obtained.

EXAMPLE 3

Figure 17:
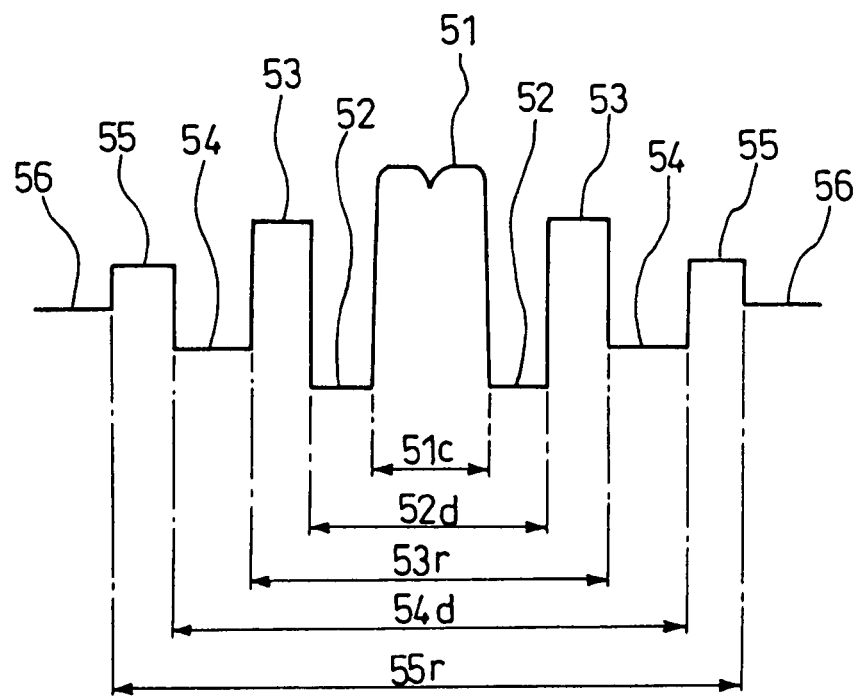
FIG. 17 is a schematic view showing a refractive index profile of an optical fiber preform for a five-fold-cladding optical fiber.

Example 3 relates to methods of manufacturing an optical fiber and an optical fiber preform having a refractive index profile shown in FIG. 17. FIG. 17 shows the refractive index profile of an optical fiber preform for forming a five-fold-cladding optical fiber. In the optical fiber preform shown in FIG. 17, the refractive indexes of a central core 51, a first depressed portion 52, a first ring portion 53, a second depressed portion 54, and a second ring portion 55, and an outer cladding 56 are represented by Nc, Nd1, Nr1, Nd2, Nr2, and No, respectively. In addition, the relative refractive index differences of the refractive indexes Nc, Nd1, Nr1, Nd2, and Nr2 with respect to the refractive index No of the outer cladding are represented by Δc, Δd1, Δr1, Δd2, and Δr2, respectively. The relative refractive index differences Δc, Δd1, Δr1, Δd2, and Δr2 are 0.5%, −0.3%, 0.27%, −0.15%, and 0.17%, respectively, and the equation Nc>Nr1≧Nr2>No>Nd2≧Nd1 holds.

In addition, the ratio of a diameter 51c of the central core 51 to an outer diameter 52d of the first depressed portion 52 is 0.6, the ratio of an outer diameter 52d of the first depressed portion 52 to an outer diameter 53r of the firs ring portion 53 is 0.63, the ratio of the outer diameter 53r of the first ring portion 53 to an outer diameter 54d of the second depressed portion 54 is 0.61, and the ratio of the outer diameter 54d of the second depressed portion 54 to an outer diameter 55r of the second ring portion 55 is 0.7.

In order to manufacture this optical fiber preform for the five-fold-cladding optical fiber, the starting pipe is used as a part corresponding to the second ring portion 55, and glass layers to be formed into the second depressed portion 54, the first ring portion 53, the first depressed portion 52, and the central core 51 are deposited in the enumerated order by an inside vapor phase deposition method. Subsequently, the resulting glass pipe is collapsed by a collapsing method. Except those described above, the optical fiber preform and the optical fiber can be manufactured in the same manner as that described in the embodiment.

EXAMPLE 4

Figure 18:
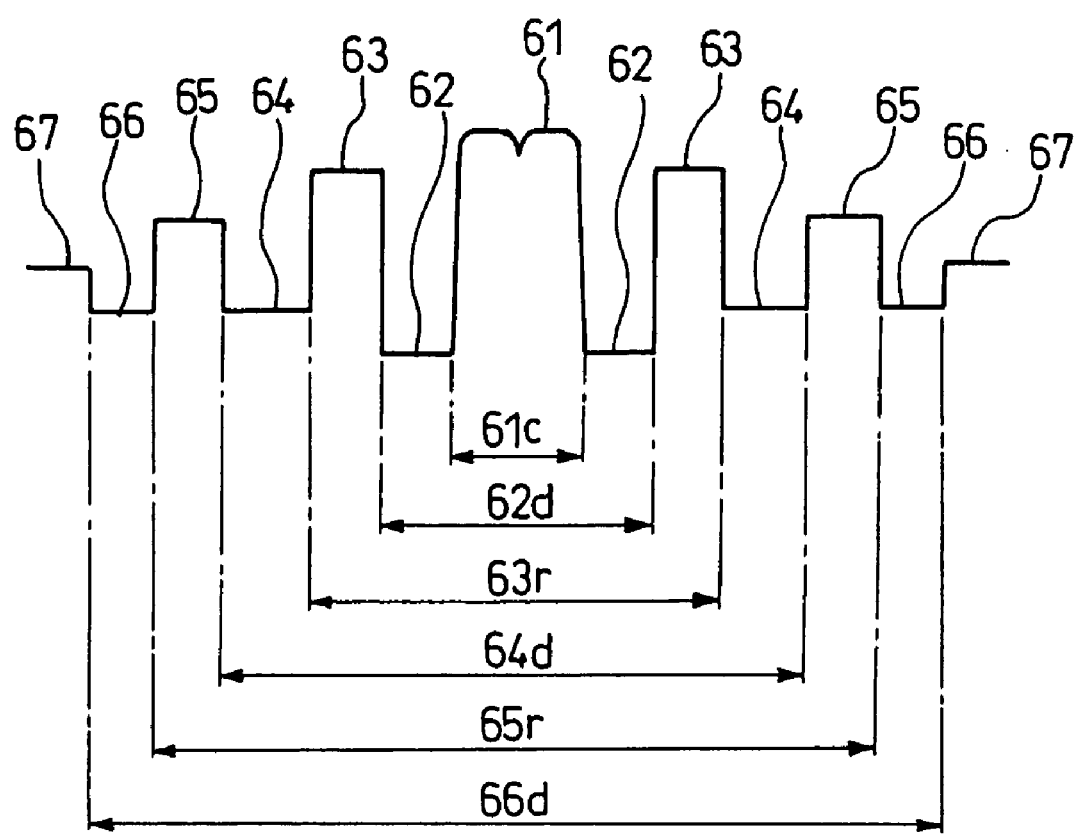
FIG. 18 is a schematic view showing a refractive index profile of an optical fiber preform for a six-fold-cladding optical fiber.

Example 4 relates to methods of manufacturing an optical fiber and an optical fiber preform having a refractive index profile shown in FIG. 18. FIG. 18 shows the refractive index profile of an optical fiber preform for forming a six-fold-cladding optical fiber. In the optical fiber preform shown in FIG. 18, the refractive indexes of a central core 61, a first depressed portion 62, a first ring portion 63, a second depressed portion 64, and a second ring portion 65, a third depressed portion 66, and an outer cladding 67 are represented by Nc, Nd1, Nr1, Nd2, Nr2, Nd3, and No, respectively. In addition, the relative refractive index differences of the refractive indexes Nc, Nd1, Nr1, Nd2, Nr2, and Nd3 with respect to the refractive index No of the outer cladding are represented by $\Delta c$, $\Delta d1$, $\Delta r1$, $\Delta d2$, $\Delta r2$, and $\Delta r3$, respectively. The relative refractive index differences $\Delta c$, $\Delta d1$, $\Delta r1$, $\Delta d2$, $\Delta r2$, and $\Delta r3$ are 0.5%, −0.3%, 0.27%, −0.15%, 0.17%, and −0.15%, respectively, and the equation $Nc > Nr1 \geq Nr2 > No > Nd3 \geq Nd2 \geq Nd1$ holds.

In addition, the ratio of a diameter 61c of the central core 61 to an outer diameter 62d of the first depressed portion 62 is 0.6, the ratio of the outer diameter 62d of the first depressed portion 62 to an outer diameter 63r of the firs ring portion 63 is 0.63, the ratio of the outer diameter 63r of the first ring portion 63 to an outer diameter 64d of the second depressed portion 64 is 0.61, the ratio of the outer diameter 64d of the second depressed portion 64 to an outer diameter 65r of the second ring portion 65 is 0.7, and the ratio of the outer diameter 65r of the second ring portion 65 to an outer diameter 66d of the third depressed portion 66 is 0.77.

In order to manufacture the optical fiber preform for a six-fold-cladding optical fiber, the starting pipe is used as a part to be formed into the third depressed portion 66, and glass layers that are to be formed into the second ring portion 65, second depressed portion 64, the first ring portion 63, the first depressed portion 62, and the central core 61 are deposited in the enumerated order by an inside vapor phase deposition method. Subsequently, the resulting glass pipe is collapsed by a collapsing method. Except those described above, the optical fiber preform and the optical fiber can be manufactured in the same manner as that described in the embodiment.

An optical fiber having a multi-fold-cladding can be manufactured by the methods described above, not limiting to the five-fold-cladding optical fiber and the six-fold-cladding optical fiber as described above. When a plurality of depressed portions and a plurality of ring portions are present, the refractive index of each depressed portion is set smaller than that of an outer cladding layer, and the refractive index of each ring portion is set larger than that of an outer cladding layer. In this case, a refractive index Nc of a central core, a refractive index Nd of a depressed portion, a refractive index Nr of a ring portion, and a refractive index No of an outer cladding layer satisfy the relationship $Nc > Nr > No > Nd$.

In all the examples described above, in addition to the method of synthesizing the jacket layer as described above, the jacket layer may be formed by dehydrating and consolidating fine glass particles deposited by a VAD or an outside vapor phase deposition method using a plurality of burners.

All the disclosure of Japanese Patent Application No. 2003-291344 (filed Aug. 11, 2003) including the specification, claims, figures, abstract is hereby incorporated by reference.

INDUSTRIAL APPLICABILITY

According to the present invention, with respect to a method of manufacturing an optical fiber preform, comprising the steps of depositing, inside a starting pipe, a plurality of glass layers having different refractive indexes from each other and collapsing the resulting glass pipe so as to form a glass rod, a desired refractive index profile can be obtained, and in addition, an increase in loss due to the absorption of OH groups can be suppressed.

The invention claimed is:

1. A method of manufacturing an optical fiber preform, comprising:
    subjecting a starting pipe including not less than 0.1 percent by weight of chlorine to an inside vapor phase deposition so that a glass layer to be formed into a core and a glass layer to be formed into a part of a cladding are deposited inside the starting pipe, the glass layers each containing at least one of fluorine, germanium, phosphorous, and chlorine, the starting pipe being made of silica glass and having an outside diameter in the range of 20 mm to 150 mm and a wall thickness in the range of 2 mm to 8 mm, and thereby forming a pipe having a glass layer to be formed into a core; and
    collapsing said pipe so as to form a glass rod in which the concentration of OH groups is 10 weight ppm or less in a region from the surface of the glass rod to a depth of 1 mm therefrom.

2. The method of manufacturing an optical fiber preform, according to claim 1,
    wherein the concentration of hydroxyl groups is 1 weight ppm or less.

3. The method of manufacturing an optical fiber preform, according to claim 1,
    wherein the starting pipe is a pipe made of a silica glass containing fluorine.

4. The method of manufacturing an optical fiber preform, according to claim 1,
    wherein the starting pipe is formed by depositing fine glass particles, followed by dehydration and consolidation, and the concentration of hydroxyl groups present in the starting pipe is 0.01 weight ppm or less.

5. The method of manufacturing an optical fiber preform, according to claim 1,
    wherein the unevenness of a wall thickness of the starting pipe is 0.3% or less over the entire length thereof.

6. The method of manufacturing an optical fiber preform, according to claim 1,
    wherein, the non-circularities of the inside diameter and the outside diameter of the starting pipe are each 1 percent or less.

7. The method of manufacturing an optical fiber preform, according to claim 1,
wherein the inside vapor phase deposition method is an MCVD method, and the deposition rate of depositing the glass layer is 0.4 g/min or more.

8. The method of manufacturing an optical fiber preform, according to claim 7,
wherein the deposition rate is 1.0 g/min or more.

9. The method of manufacturing an optical fiber preform, according to claim 1,
wherein the total thickness of the glass layer to be formed into a core and the glass layer to be formed into a part of a cladding is 1 mm or more, and the wall thickness of the pipe having the glass layer to be formed into a core is 8 mm or less.

10. The method of manufacturing an optical fiber preform, according to claim 1,
wherein the core non-circularity of the glass rod is 0.4% or less, and the number of bubbles on the central axis of the glass rod is one or less per 10 mm length.

11. The method of manufacturing an optical fiber preform, according to claim 1,
wherein the non-circularity of a part of the glass rod which is deposited by the inside vapor phase deposition method is 1.5% or less, and the number of bubbles on the central axis of the glass rod is one or less per 10 mm length.

12. The method of manufacturing an optical fiber preform, according to claim 1,
wherein the collapsing comprises a first heating step in which one end of the pipe having the glass layer to be formed into a core is heated and collapsed and a second heating step in which the pipe having the glass layer to be formed into a core is heated and collapsed from the one end to the other end, and a surface heating temperature T1 of the one end in the first heating step is higher than a surface heating temperature T2 of the heated part of the pipe in the second heating step, the pipe having the glass layer to be formed into a core.

13. The method of manufacturing an optical fiber preform, according to claim 7,
wherein a heat source for the MCVD method is one of an induction furnace, a resistance furnace, and a plasma torch.

14. The method of manufacturing an optical fiber preform, according to claim 1,
wherein a heat source for the collapsing is one of an induction furnace, a resistance furnace, and a plasma torch.

15. A method of manufacturing an optical fiber, comprising the step of drawing the optical fiber preform manufactured by the manufacturing method according to claim 1.

16. The method of manufacturing an optical fiber, according to claim 15,
wherein, in said step of drawing, the glass rod is inserted into a jacket pipe, and the glass rod and the jacket pipe are drawn while they are being unified together by heating.

17. The method of manufacturing an optical fiber, according to claim 16,
wherein the jacket pipe is formed by depositing fine glass particles, followed by dehydration and consolidation, and the concentration of hydroxyl groups present in the jacket pipe is 0.01 weight ppm or less.

18. An optical fiber manufactured by the manufacturing method according to claim 15.

19. The optical fiber according to claim 18,
wherein the polarization mode dispersion is 0.15 ps/km$^{1/2}$ or less.

20. The optical fiber according to claim 18,
wherein the absorption loss caused by hydroxyl groups at a wavelength of 1.38 μm is 0.2 dB/km or less.

* * * * *